(12) United States Patent
Ben-Haim et al.

(10) Patent No.: US 11,753,142 B1
(45) Date of Patent: Sep. 12, 2023

(54) NOISE MODULATION FOR UNMANNED AERIAL VEHICLES

(71) Applicant: Snap Inc., Santa Monica, CA (US)

(72) Inventors: Yoav Ben-Haim, Venice, CA (US); Scott Porter, Inglewood, CA (US)

(73) Assignee: Snap Inc., Santa Monica, CA (US)

( * ) Notice: Subject to any disclaimer, the term of this patent is extended or adjusted under 35 U.S.C. 154(b) by 1,268 days.

(21) Appl. No.: 16/146,364

(22) Filed: Sep. 28, 2018

Related U.S. Application Data

(60) Provisional application No. 62/566,108, filed on Sep. 29, 2017.

(51) Int. Cl.
| | |
|---|---|
| *B64C 11/18* | (2006.01) |
| *B64C 39/02* | (2023.01) |
| *B64U 10/13* | (2023.01) |
| *B64U 30/20* | (2023.01) |
| *G10K 15/04* | (2006.01) |
| *B64C 27/14* | (2006.01) |

(52) U.S. Cl.
CPC .............. *B64C 11/18* (2013.01); *B64C 39/024* (2013.01); *G10K 15/04* (2013.01); *B64C 27/14* (2013.01); *B64C 2220/00* (2013.01); *B64U 10/13* (2023.01); *B64U 30/20* (2023.01); *G10H 2210/571* (2013.01)

(58) Field of Classification Search
CPC ..... B64C 11/18; B64C 27/467; B64C 2220/00
See application file for complete search history.

(56) References Cited

U.S. PATENT DOCUMENTS

| | | | |
|---|---|---|---|
| 6,038,295 | A | 3/2000 | Mattes |
| 6,819,982 | B2 | 11/2004 | Doane |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 7,542,073 | B2 | 6/2009 | Li et al. |
| 8,131,597 | B2 | 3/2012 | Hudetz et al. |
| 8,174,562 | B2 | 5/2012 | Hartman |
| 8,199,747 | B2 | 6/2012 | Rojas |
| 8,274,550 | B2 | 9/2012 | Steuart, III |

(Continued)

FOREIGN PATENT DOCUMENTS

CA 2887596 A1 7/2015

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.

(Continued)

*Primary Examiner* — Nicholas McFall
(74) *Attorney, Agent, or Firm* — Schwegman Lundberg & Woessner, P.A.

(57) ABSTRACT

Various mechanisms and methods for altering sound output from an unmanned aerial vehicle (UAV) are disclosed. The UAV can have a drive system comprising a motor or a plurality of motors, and a processor operatively coupled to the drive system to control operation of the drive system. The UAV can further have a plurality of propellers that are rotatably drivable by the drive system, the plurality of propellers having physical characteristics such that, when drivingly rotated to maintain the UAV in stable flight, a first of the plurality of propellers emits a first note, and a second of the plurality of propellers emits a second, different note, a combination of the first and second notes producing a consonant sound.

20 Claims, 10 Drawing Sheets

(56) References Cited

U.S. PATENT DOCUMENTS

| | | | |
|---|---|---|---|
| 8,332,475 | B2 | 12/2012 | Rosen et al. |
| 8,646,720 | B2 | 2/2014 | Shaw |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root et al. |
| 9,344,642 | B2 | 5/2016 | Niemi et al. |
| 9,345,711 | B2 | 5/2016 | Friedhoff |
| 9,443,227 | B2 | 9/2016 | Evans et al. |
| 9,471,059 | B1 | 10/2016 | Wilkins |
| 9,489,661 | B2 | 11/2016 | Evans et al. |
| 9,489,937 | B1 | 11/2016 | Beard et al. |
| 9,491,134 | B2 | 11/2016 | Rosen et al. |
| 9,576,369 | B2 | 2/2017 | Venkataraman et al. |
| 9,589,448 | B1 | 3/2017 | Schneider et al. |
| 9,681,046 | B2 | 6/2017 | Adsumilli et al. |
| 9,723,272 | B2 | 8/2017 | Lu et al. |
| 9,747,901 | B1 | 8/2017 | Gentry |
| 9,922,659 | B2 | 3/2018 | Bradlow et al. |
| 9,989,965 | B2 | 6/2018 | Cuban et al. |
| 10,061,328 | B2 | 8/2018 | Canoy et al. |
| 10,109,224 | B1 | 10/2018 | Ratti et al. |
| 10,118,692 | B1* | 11/2018 | Beckman et al. .. G06Q 10/0832 |
| 10,140,987 | B2 | 11/2018 | Erickson et al. |
| 10,168,700 | B2 | 1/2019 | Gordon et al. |
| 10,370,118 | B1 | 8/2019 | Nielsen et al. |
| 10,501,180 | B2 | 12/2019 | Yu |
| 10,714,069 | B1* | 7/2020 | Ratner .............. G10K 11/1752 |
| 10,768,639 | B1 | 9/2020 | Meisenholder et al. |
| 11,126,206 | B2 | 9/2021 | Meisenholder et al. |
| 2007/0250526 | A1 | 10/2007 | Hanna |
| 2008/0255842 | A1 | 10/2008 | Simhi |
| 2009/0122133 | A1 | 5/2009 | Hartman |
| 2011/0202598 | A1 | 8/2011 | Evans et al. |
| 2012/0194420 | A1 | 8/2012 | Osterhout et al. |
| 2012/0209924 | A1 | 8/2012 | Evans et al. |
| 2012/0281885 | A1 | 11/2012 | Syrdal et al. |
| 2012/0287274 | A1 | 11/2012 | Bevirt |
| 2013/0056581 | A1 | 3/2013 | Sparks |
| 2013/0238168 | A1 | 9/2013 | Reyes |
| 2014/0254896 | A1 | 9/2014 | Zhou et al. |
| 2015/0022432 | A1 | 1/2015 | Stewart et al. |
| 2015/0070272 | A1 | 3/2015 | Kim et al. |
| 2015/0175263 | A1 | 6/2015 | Reyes |
| 2015/0199022 | A1 | 7/2015 | Gottesman et al. |
| 2015/0287246 | A1 | 10/2015 | Huston et al. |
| 2015/0331490 | A1 | 11/2015 | Yamada |
| 2015/0362917 | A1 | 12/2015 | Wang et al. |
| 2016/0063987 | A1 | 3/2016 | Xu et al. |
| 2016/0161946 | A1 | 6/2016 | Wuth Sepulveda et al. |
| 2016/0179096 | A1 | 6/2016 | Bradlow et al. |
| 2016/0292886 | A1 | 10/2016 | Erad et al. |
| 2016/0307573 | A1 | 10/2016 | Wobrock |
| 2016/0336020 | A1 | 11/2016 | Bradlow et al. |
| 2017/0031369 | A1 | 2/2017 | Liu et al. |
| 2017/0094259 | A1 | 3/2017 | Kouperman et al. |
| 2017/0099424 | A1 | 4/2017 | Jones |
| 2017/0102699 | A1 | 4/2017 | Anderson |
| 2017/0177925 | A1 | 6/2017 | Volkart |
| 2017/0225796 | A1 | 8/2017 | Sun et al. |
| 2017/0228690 | A1 | 8/2017 | Kohli |
| 2017/0244937 | A1 | 8/2017 | Meier et al. |
| 2017/0320564 | A1 | 11/2017 | Kuzikov |
| 2017/0337791 | A1 | 11/2017 | Gordon-Carroll |
| 2017/0371353 | A1 | 12/2017 | Millinger, III |
| 2018/0082682 | A1 | 3/2018 | Erickson et al. |
| 2018/0246529 | A1 | 8/2018 | Hu et al. |
| 2019/0011921 | A1 | 1/2019 | Wang et al. |
| 2020/0241575 | A1 | 7/2020 | Meisenholder et al. |
| 2021/0362848 | A1 | 11/2021 | Spencer |
| 2021/0382503 | A1 | 12/2021 | Meisenholder et al. |

OTHER PUBLICATIONS

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, Oct. 22-25, 2017), 635-343.

* cited by examiner

| NOTE | FREQUENCY (Hz) | FREQUENCY DISTANCE FROM PREVIOUS NOTE | LOG FREQUENCY LOG2 f | LOG FREQUENCY DISTANCE FROM PREVIOUS NOTE | EXACT FORMULA |
|---|---|---|---|---|---|
| A2 | 110 | N/A | 6.781 | N/A | 110x(2^0/12) |
| A#2 | 116.54 | 6.54 | 6.864 | 0.0833 (OR 1/12) | 110x(2^1/12) |
| B2 | 123.47 | 6.93 | 6.948 | 0.0833 | 110x(2^2/12) |
| C3 | 130.81 | 7.34 | 7.031 | 0.0833 | 110x(2^3/12) |
| C#3 | 138.59 | 7.78 | 7.115 | 0.0833 | 110x(2^4/12) |
| D3 | 146.83 | 8.24 | 7.198 | 0.0833 | 110x(2^5/12) |
| D#3 | 155.56 | 8.73 | 7.281 | 0.0833 | 110x(2^6/12) |
| E3 | 164.81 | 9.25 | 7.365 | 0.0833 | 110x(2^7/12) |
| F3 | 174.61 | 9.8 | 7.448 | 0.0833 | 110x(2^8/12) |
| F#3 | 185 | 10.39 | 7.531 | 0.0833 | 110x(2^9/12) |
| G3 | 196 | 11 | 7.615 | 0.0833 | 110x(2^10/12) |
| G#3 | 207.65 | 11.65 | 7.698 | 0.0833 | 110x(2^11/12) |
| A3 | 220 | 12.35 | 7.781 | 0.0833 | 110x(2^12/12) |

FIG. 5A

| C CORD | LOG2 (f) | DIFFERENCE |  | D CORD | LOG2 (f) | DIFFERENCE |
|---|---|---|---|---|---|---|
| C | 7.031 |  |  | D | 7.198 |  |
| E | 7.365 | 0.334 |  | F# | 7.531 | 0.333 |
| G | 7.615 | 0.584 |  | A | 7.781 | 0.583 |
|  |  |  |  |  |  |  |
| E CORD | LOG2 (f) | DIFFERENCE |  |  |  |  |
| E | 7.365 |  |  |  |  |  |
| G# | 7.698 | 0.333 |  |  |  |  |
| C CORD | 7.948 | 0.583 |  |  |  |  |

FIG. 5B

NOISE MODULATION FOR UNMANNED AERIAL VEHICLES

PRIORITY

This application claims the benefit of priority of U.S. Provisional Application Serial No. 62/566,108, filed on Sep. 29, 2017, which is hereby incorporated by reference herein in its entirety

FIELD OF THE DISCLOSURE

The present disclosure relates to noise modulation structures and mechanisms for unmanned aerial vehicles ("UAV"), sometimes referred to as drones.

BACKGROUND

Drones in the industry today, particularly consumer recreational drones (e.g., miniature UAVs), can be characterized as utilizing rotor blades that produce an unpleasant sound to the human ear. As shown in FIG. 4, human hearing has a pain threshold that is a function of the frequency and amplitude of a particular sound. At certain frequencies and amplitude, a sound can be pleasant to the human ear (e.g., music spectrum of FIG. 4), it can be innocuous (e.g., speech and hearing domain spectrums of FIG. 4), or it can be unpleasant or even harmful to the human ear (e.g., the pain threshold spectrum of FIG. 4).

Current UAVs usually utilize multiple propeller arrangements to provide stable thrust. And, frequently, the propellers are all of the same size and pitch. This results in a situation in which, during hover, each propeller spins at the same rate (i.e., the same frequency) and produces a sound frequency with an associated pitch. For small UAVs, the propellers are typically spinning at very high RPMs (e.g., 20,000-50,000 RPM, which produces a sound frequency of 333 Hz-833 Hz). Multiple blades can add other noise overtones with higher frequencies as well. Within the aforementioned range of sound frequencies, the human ear is particularly sensitive.

SUMMARY

To better illustrate the system disclosed herein, a non-limiting list of examples is provided here:

Example 1 includes an unmanned aerial vehicle (UAV) comprising a drive system comprising a motor or a plurality of motors, a computing device operatively coupled to the drive system to control operation of the drive system, and a plurality of propellers that are rotatably drivable by the drive system, the plurality of propellers having physical characteristics such that, when drivingly rotated to maintain the UAV in stable flight, a first of the plurality of propellers emits a first note, and a second of the plurality of propellers emits a second, different note, a combination of the first and second notes producing a consonant sound. In some embodiments, a combination of a first note and a second note is considered to produce a consonant sound when the frequencies of the first and second notes are in an integer ratio. In some embodiments, a combination of the first note of a higher frequency and second note of a lower frequency are considered to produce a consonant sound when the phase relation of the first not (higher frequency) relative to the second note (lower frequency) is time-independent or when the resulting overall waveform is stationary/time-stable.

Example 2 includes the UAV of Example 1, wherein the combination of the first and second notes produces a musical chord.

Example 3 includes the UAV of any one of or any combination of Examples 1-2, wherein the physical characteristics of a third of the plurality of propellers is such that, when drivingly rotated to maintain the UAV in stable flight, the third propeller emits a third note different from the first and second notes, a combination of the first through third notes producing a consonant sound.

Example 4 includes the UAV of Example 3, wherein the combination of the first through third notes produces a musical chord.

Example 5 includes the UAV of any one of or any combination of Examples 1-4, wherein the first propeller has a first diameter and the second propeller has a second, different diameter.

Example 6 includes the UAV of Example 5, wherein the computing device has program instructions that, when executed by the computing device, cause the drive system to drive the motor or plurality of motors at first and second rotational speeds, thereby rotating the first propeller at a first RPM and the second propeller at a second RPM.

Example 7 includes the UAV of any one of or any combination of Examples 1-6, wherein the first note has a first sound frequency $F_1$ and the second note has a second, different sound frequency $F_2$, and a difference between $\log2(F_1)$ and $\log2(F_2)$ is about 0.33.

Example 8 includes the UAV of Example 3, wherein the first note has a first sound frequency $F_1$, the second note has a second, different sound frequency $F_2$, and the third note has a third, different sound frequency $F_3$, a difference between $\log2(F_1)$ and $\log2(F_2)$ being about 0.33, and a difference between $\log2(F_1)$ and $\log2(F_3)$ being about 0.58.

Example 9 includes the UAV of any one of or any combination of Examples 1-8, wherein the first and second propellers each has at least a first design feature that is different amongst the first and second propellers, the design feature being selected from the group consisting of: (i) blade radius, (ii) blade pitch, (iii) planform area, (iv) number of blades, (v) blade stiffness, (vi) blade tip geometry, (vii) blade leading edge radius, (vii) blade chord length, (viii) blade maximum camber, (ix) blade maximum thickness, and (x) position of the propeller relative to a body of the UAV.

Example 10 includes the UAV of Example 9, wherein the first design feature that is different amongst the first and second propellers is selected so that the first propeller, when rotated, emits the first note, and the second propeller, when rotated, emits the second note.

Example 11 includes the UAV of any one of or any combination of Examples 1-10, wherein all of the propellers of the UAV have physical characteristics such that, when drivingly rotated to maintain the UAV in stable flight, all of the propellers emit notes that, in combination, produce a consonant sound.

Example 12 includes the UAV of any one of or any combination of Examples 1-11, wherein the first and second propellers produce the first and second notes when the UAV is in hover.

Example 13 includes a method of producing a sound using an unmanned aerial vehicle (UAV) comprising operating the UAV to cause first and second propellers of the UAV to rotate and emit first and second sounds that correspond to first and second different notes, a combination of the first and second different notes producing a consonant sound.

Example 14 includes the method of Example 13, further comprising rotating the first propeller at a first speed to produce the first note, and rotating the second propeller at a second, different speed to produce the second note.

Example 15 includes the method of any one of or any combination of Examples 13-14, wherein the combination of the first and second notes produces a musical chord.

Example 16 includes the method of any one of or any combination of Examples 13-15, further comprising operating the UAV to cause a third propeller to rotate and emit a third sound that corresponds to a third note that is different from the first and second notes, a combination of the first through third notes producing a consonant sound.

Example 17 includes the method of Example 16, wherein the combination of the first through third notes produces a musical chord.

Example 18 includes the method of Example 16, further comprising rotating the first propeller at a first speed to produce the first note, rotating the second propeller at a second, different speed to produce the second note, and rotating the third propeller at a third speed different from the first and second speeds to produce the third note.

Example 19 includes the method of any one of or any combination of Examples 13-18, wherein the first propeller has a first diameter and the second propeller has a second, different diameter.

Example 20 includes the method of Example 16, wherein the first note has a first sound frequency $F_1$, the second note has a second, different sound frequency $F_2$, and the third note has a third, different sound frequency $F_3$, a difference between $\log2(F_1)$ and $\log2(F_2)$ being about 0.33, and a difference between $\log2(F_1)$ and $\log2(F_3)$ being about 0.58.

Example 21 includes the method of any one of or any combination of Examples 13-20, further comprising operating the UAV so that all propellers of the UAV emit notes that, when combined, produce a consonant sound.

Example 22 includes an unmanned aerial vehicle (UAV) comprising a drive system comprising a motor or a plurality of motors, a computing device operatively coupled to the drive system to control operation of the drive system, and a plurality of propellers rotatably drivable by the drive system, the plurality of propellers having physical characteristics such that, when drivingly rotated to maintain the UAV in stable flight, a first of the plurality of propellers emits a first note, a second of the plurality of propellers emits a second, different note, and a third of the plurality of propellers emits a third note different from the first and second notes, a combination of the first through third notes producing a consonant sound, wherein the first note has a first sound frequency $F_1$, the second note has a second, different sound frequency $F_2$, and the third note has a third, different sound frequency $F_3$, a difference between $\log2(F_1)$ and $\log2(F_2)$ being about 0.33, and a difference between $\log2(F_1)$ and $\log2(F_3)$ being about 0.58.

Example 23 includes the UAV of Example 22, wherein the combination of the first through third notes produces a musical chord.

Example 24 includes the UAV of any one of or any combination of Examples 22-23, wherein the first through third propellers each has a different diameter.

Example 25 includes the UAV of any one of or any combination of Examples 22-24, wherein the computing device has program instructions that, when executed by the computing device, cause the drive system to drive the motor or plurality of motors at different rotational speeds, thereby rotating the first propeller at a first RPM, the second propeller at a second RPM, and the third propeller at a third RPM.

Example 26 includes the UAV of any one of or any combination of Examples 22-25, wherein all of the propellers of the UAV have physical characteristics such that, when drivingly rotated to maintain the UAV in stable flight, all of the propellers emit notes that, in combination, produce a consonant sound.

BRIEF DESCRIPTION OF THE FIGURES

The above-mentioned and other features and advantages of this disclosure, and the manner of attaining them, will become more apparent and the disclosure itself will be better understood by reference to the following description of examples taken in conjunction with the accompanying drawings, wherein:

FIGS. 5A-B are charts exemplifying a relationship between different musical notes.

DETAILED DESCRIPTION

Figure 1:
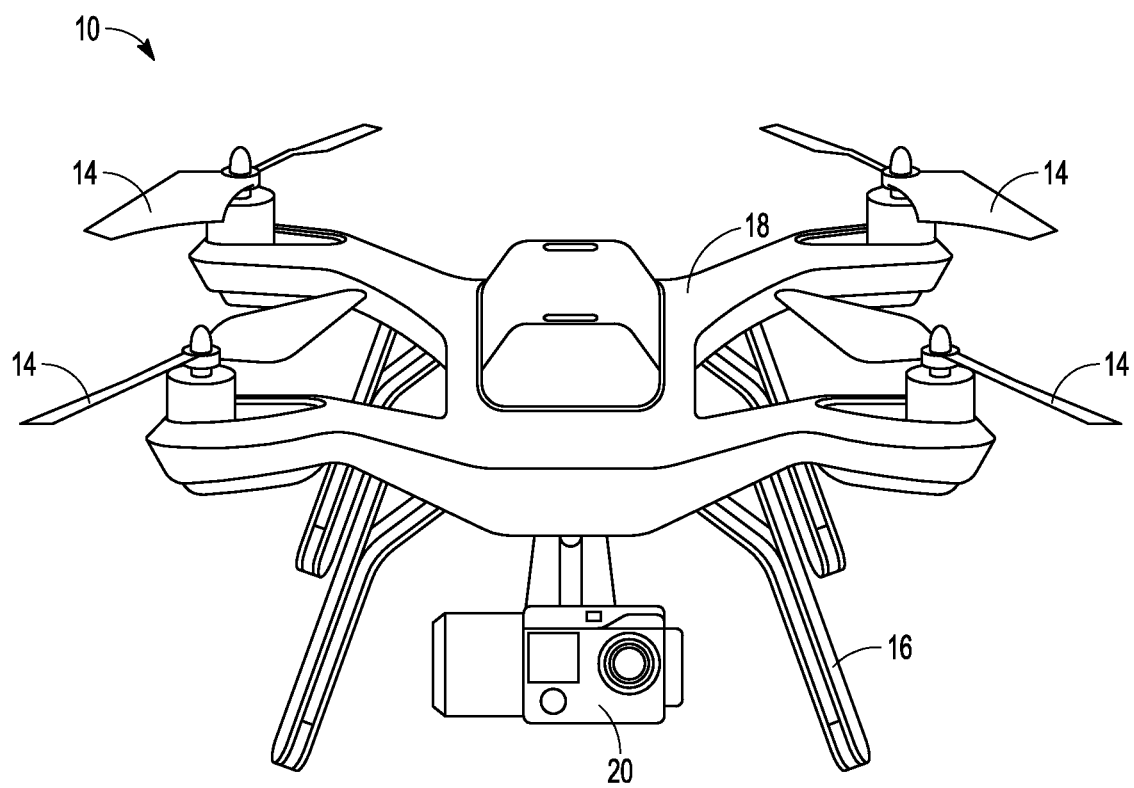
FIG. 1 is a perspective view of a UAV, according to an example of the disclosure.

Corresponding reference characters indicate corresponding parts throughout the several views. The exemplifications set out herein illustrate examples of the disclosure, and such exemplifications are not to be construed as limiting the scope of the disclosure any manner.

In describing the examples of the disclosure illustrated and to be described with respect to the drawings, specific terminology will be used for the sake of clarity. However, the disclosure is not intended to be limited to any specific terms used herein, and it is to be understood that each specific term includes all technical equivalents.

The present disclosure is directed at noise modulation structures and mechanisms for UAVs. The noise modulation structures and mechanisms can operate by changing the design of one (1) or more propellers or one (1) or more propeller blades of the UAV so that the modified design outputs a sound that is pleasing to the human ear (e.g., a consonant sound, a musical chord, etc.) A number of different example UAVs are contemplated, which can produce different sounds, as detailed below.

Figure 6:
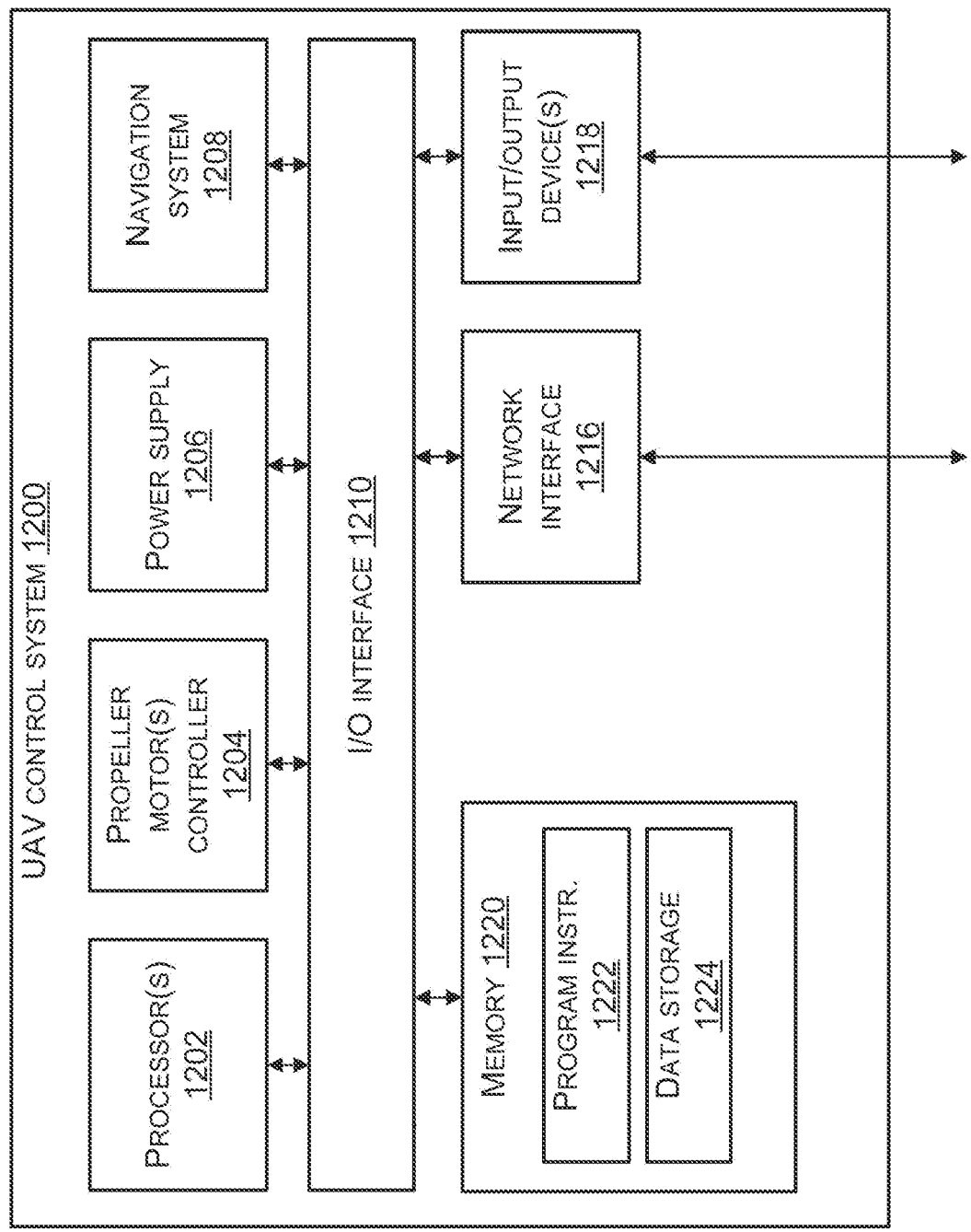
FIG. 6 is a schematic diagram of functional components of a UAV in accordance with some example embodiments.
Figure 7:
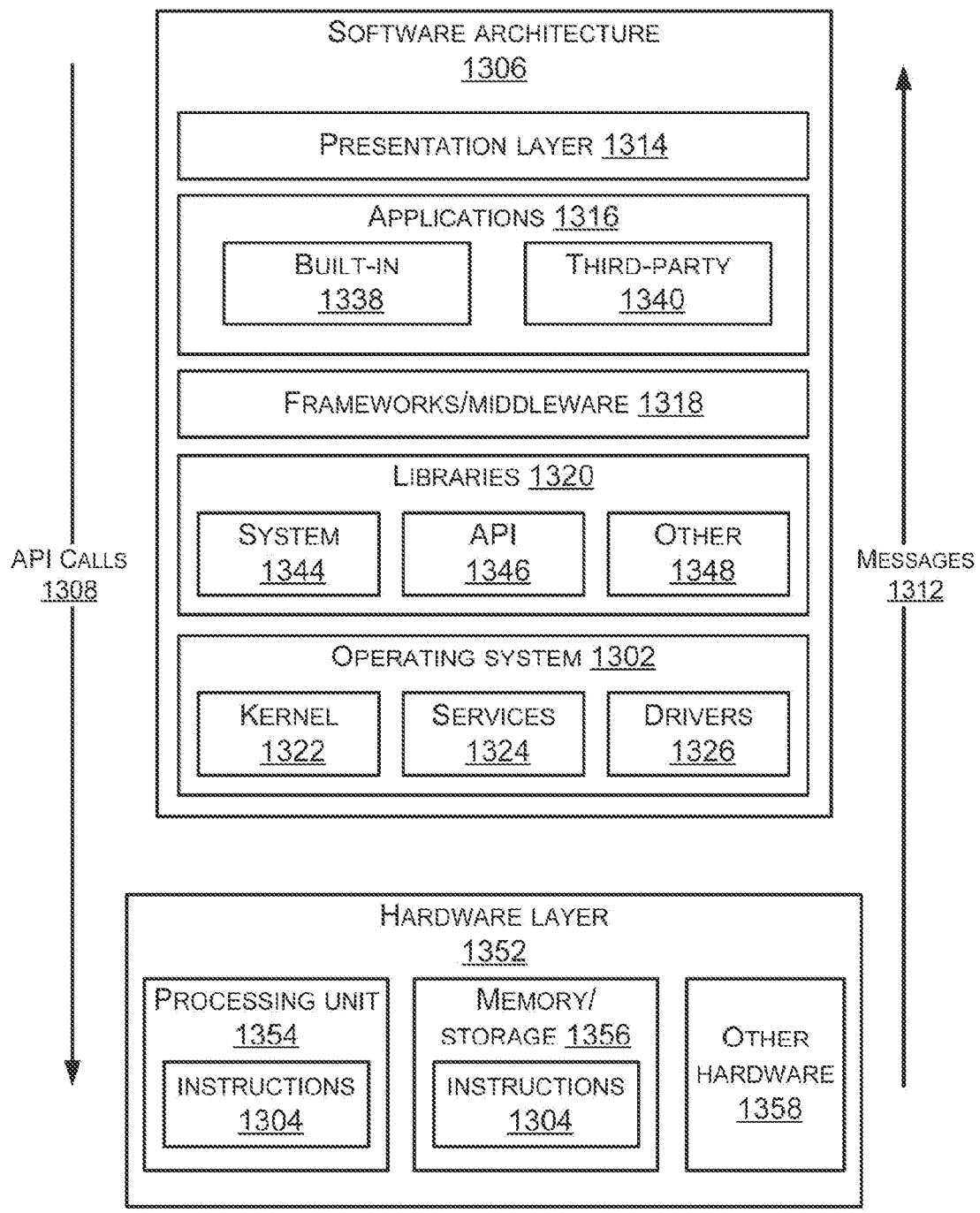
FIG. 7 is a block diagram illustrating a representative software architecture, which can be used in conjunction with various hardware architectures described herein.
Figure 8:
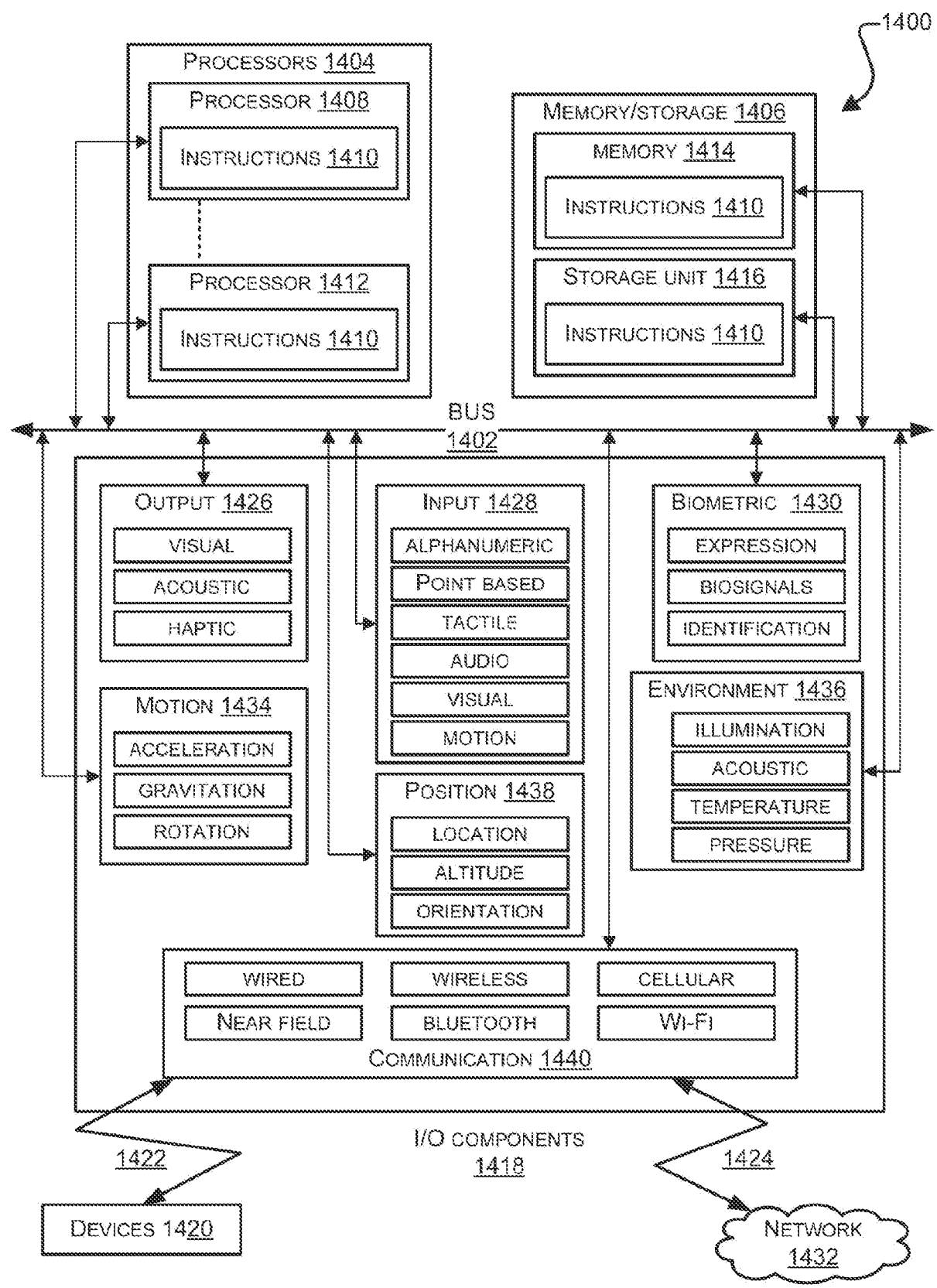
FIG. 8 is a block diagram illustrating components of a machine, according to some example embodiments, able to read instructions from a machine-readable medium (e.g., a machine-readable storage medium) and perform any one or more of the methodologies discussed herein.

FIG. 1 illustrates a UAV 10, according to an example of the disclosure. As shown, UAV 10 can have a body 18 that can contain all internal electronic components of UAV 10 -e.g., a computer having a processor and a memory or other computing components, a battery or other power source, and a motor or multiple motors for driving one (1) or more propellers 12. FIGS. 6-8, described in detail below, illustrate the computing devices and software that can be used to operate UAV 10, according to the examples disclosed herein. UAV 12 can also have a camera 20. If UAV 10 includes multiple propellers 12, a motor or multiple motors can drive each propeller 12. In an example, a motor and motor assembly can be coupled with each propeller 12, and can act to rotate each propeller 12 during use. The computer can be communicatively coupled to the motor or multiple motors through circuitry, as discussed below in the context of FIGS. 6-8, and it can be programmed to alter the output of the motor or motors (and thus, propeller(s) 12) during use.

Figure 2:
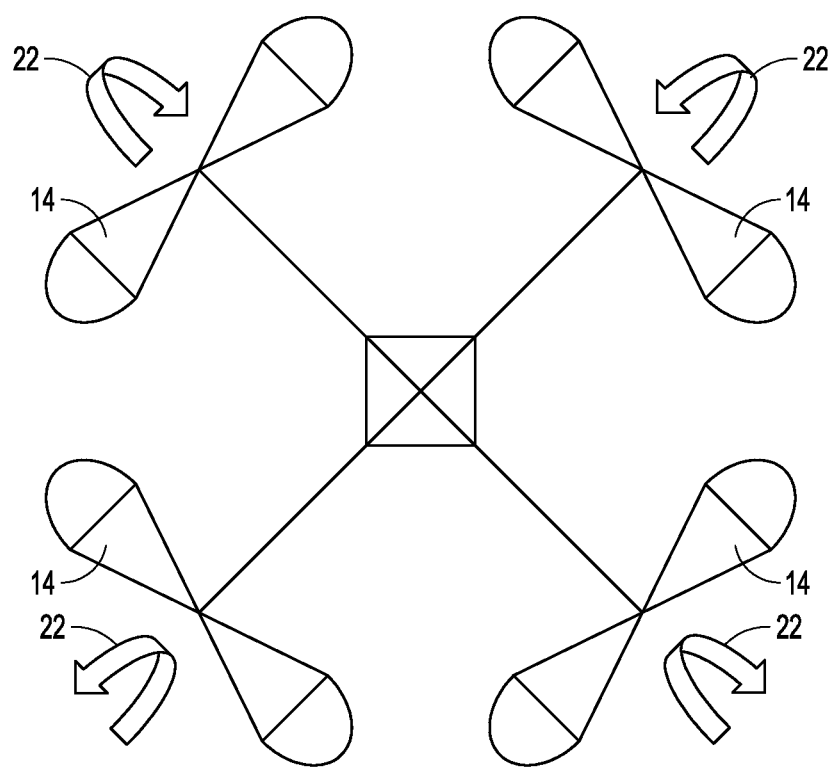
FIG. 2 is a top schematic view of the UAV of FIG. 1.

In the example of FIG. 1, UAV 10 has four (4) propellers 12, although UAV 10 can have anywhere between 1-10 propellers 12. As shown in FIGS. 1-2, propellers 12 can have one (1) or more propeller blades 14. In an example, UAV 10 can have propellers 12 with anywhere between 1-8 propeller blades 14. Propellers 12 can rotate in a clockwise or counterclockwise direction, for example as shown by way of directions 22 in FIG. 2. In addition, the computer of UAV 10 can be programmed to cause the motor or motors to rotate propellers 12 at the same rotational speed (e.g., RPM), each propeller 12 can rotate at its own unique rotational speed (RPM), or certain subsets of propellers 12 can rotate at a first rotational speed (RPM) with other subsets of propellers 12 (e.g., the remainder) rotating at a second different rotational speed (RPM). Such differences or consistency in rotational speed can assist in configuring UAV 10 to output a sound that is pleasing to a user, as set forth in more detail below.

Figure 3A:
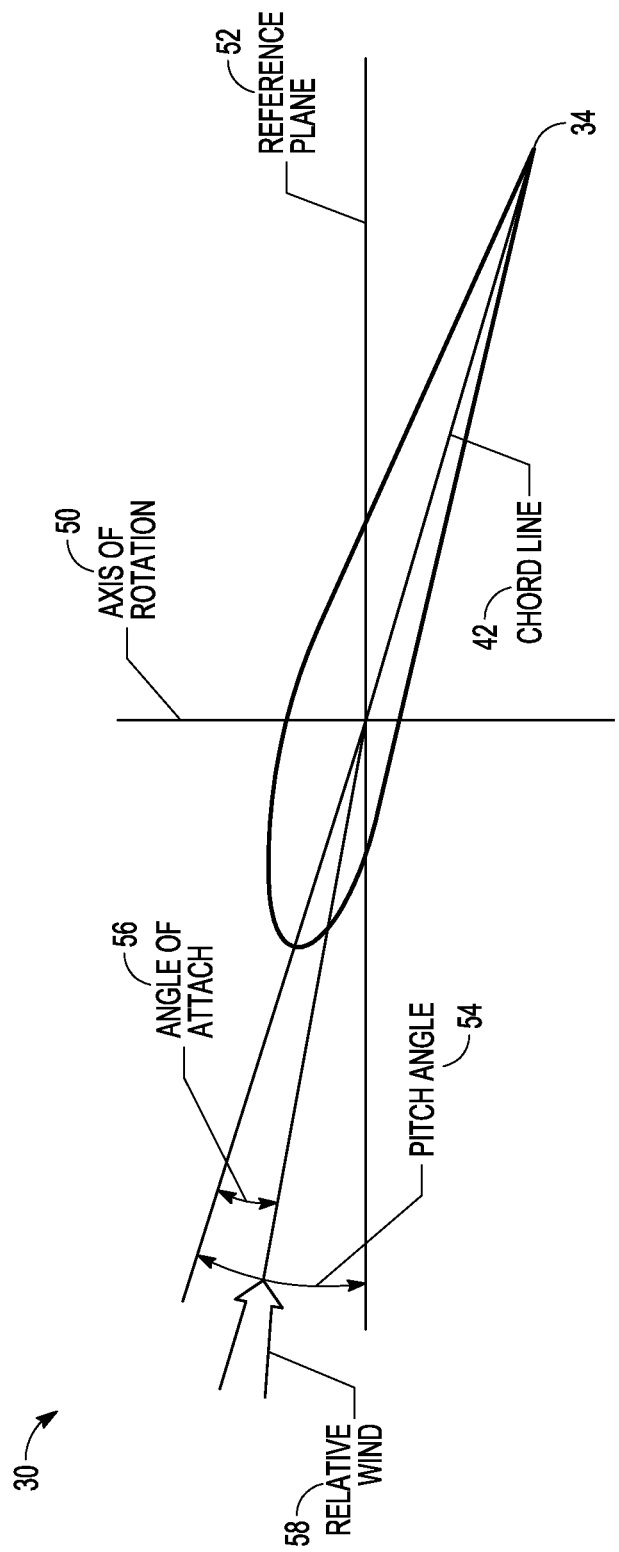
FIGS. 3A-B are cross-sectional views of a propeller blade showing various design characteristics thereof, and FIG. 3C includes a top view and different cross-sectional views of the propeller blade of FIGS. 3A-B.
Figure 3B:
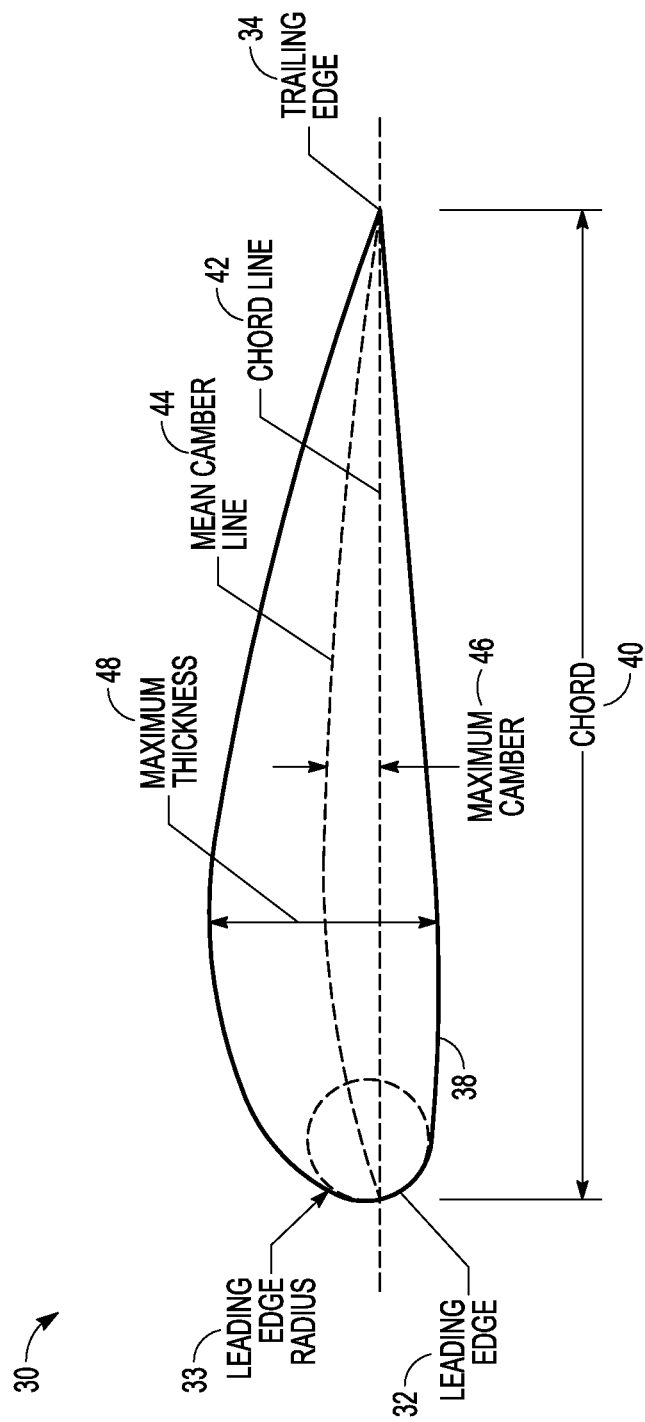
Figure 3C:
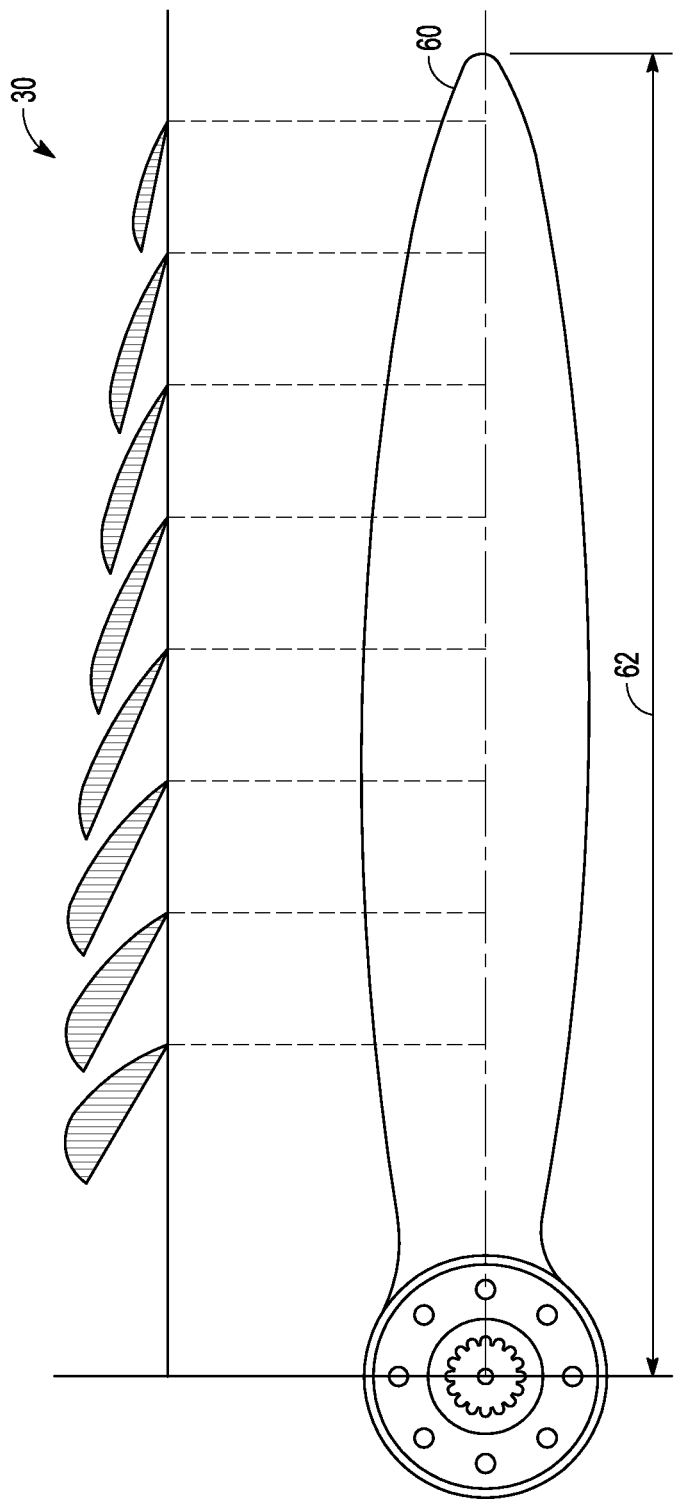
Figure 4:
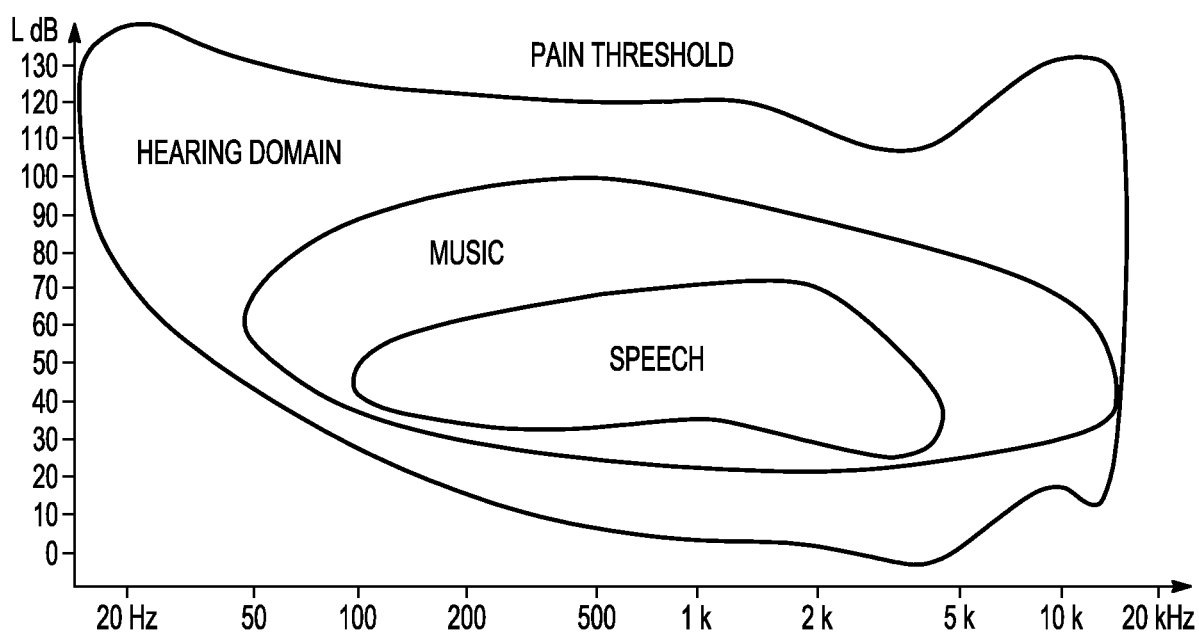
FIG. 4 is a graph illustrating the range of human hearing with sound amplitude (dB) on the y-axis and sound frequency (kHz) on the x-axis.

FIGS. 3A-C depict cross-sections of a propeller blade 14, according to an example of the disclosure. FIGS. 3A-C are provided in the present disclosure to exemplify the different design characteristics that propeller blades 14 can have. Subsequently, the disclosure describes how such design characteristics can be modified to modify the noise or sound output from UAV 10 during use.

As shown in FIG. 3B, propeller blade 14 can have a leading edge 32 defining a leading edge radius 33, a trailing edge 34, and top and bottom surfaces 36, 38 extending between leading and trailing edges 32, 34. Propeller blade 14 can also have a chord 40, which can define a chord length and a chord line 42 (an imaginary line joining leading and trailing edges 32, 34). Further, propeller blade 14 can have a mean camber line 44 and a maximum camber 46 defined as a maximum distance between chord line 42 and camber line 44. Propeller blade 14 can also have a maximum thickness 48. As shown in FIG. 3A, propeller blade 14 can additionally have a pitch angle 54, which can be the same along the length of propeller blade 14, it can increase along the length, or it can decrease (FIG. 3C) along the length. In addition, as can be appreciated from FIG. 3C, chord line 42, camber line 44, maximum camber 46, maximum thickness 48, chord length, leading edge radius 33, and/or other design characteristics of propeller blade 14 can vary along its length. Propeller blade 14 can also have a tip geometry 60, a planform area, a radius 62, and a particular stiffness. FIG. 3A additionally illustrates a relative wind direction 58 for propeller blade 14, as a point of reference.

FIGS. 5A-B illustrate note relationships for various musical notes. Musical chords can be defined as two (2) or more (usually three (3)) notes that combine harmoniously. A major chord can be comprised of the first, third, and fifth notes of the major scale of a root note. As an example, the C-major scale is comprised of the notes C, D, E, F, G, A, B in succession. To compose a C-major chord, the notes C, E, and G can be played in unison. As another example, the D-major scale is comprised of the notes D, E, F#, G, A, B, C#,
in succession. To compose a D-major chord, the notes D, F#, and A can be played in unison. There are also additional notes that can be added to the aforementioned chords that can also sound consonant - e.g., seventh or augmented notes. Of course, many chords are possible, and it is to be understood that any chord can be utilized as an output sound for UAV 10, as described more fully below. Conversely, playing certain notes with the above combinations of notes can produce a dissonant or displeasing sound. As an example, playing an F instead of F# with the D-major chord above can generate a dissonant or displeasing sound. Or, simply injecting a sound or frequency not associated with a musical note can also generate a dissonant or displeasing sound. It is to be understood that, in an example, all propellers 12 of UAV 10 can be designed to output notes that, in combination, produce a consonant sound. Alternately stated, propellers 12 can be designed as described below, such that none of propellers 12 emits a dissonant note or sound relative to other propellers 12.

FIG. 5A illustrates a mathematical relationship between certain musical notes, while FIG. 5B illustrates the mathematical relationship between the notes of a C-chord, D-chord, and an E-chord, merely as examples. As shown in FIG. 5A, a mathematical relationship between notes can be seen when the logarithm of the note frequencies is compared. Herein, log or logarithm refers to $\log_2(X)$, where X is the input (e.g., in this case, frequency or frequency difference). In short, the difference between the log of the frequency of adjacent notes amounts to roughly 0.0833. An exact formula is provided in the last column of FIG. 5A. This means that, for example, the difference between the log of the first and third notes in a major chord is about 0.33, and the difference between the log of the first and fifth notes is about 0.58. As such, no matter the root note, if two (2) notes are introduced where the difference between the log of the first note and the root note is about 0.33, and the difference between the log of the second note and the root note is about 0.58, the three (3) notes played in unison should be perceived by a human to be consonant or pleasing. FIG. 5B illustrates this concept using a C-chord, D-chord, and an E-chord. As seen in the case of a C-chord, for example, the difference between the log of the frequency of the root note (C) and the first note (E) is about 0.33, and the difference between the log of the frequency of the root note (C) and the second note (G) is about 0.58. Further, although not highlighted in FIGS. 5A-B, but recognized above, there are other combinations of notes that can sound consonant or pleasing to the human ear. In addition, such combinations of notes can also have a mathematical relationship between the notes. Such combinations and mathematical relationships are explicitly disclosed and contemplated herein as consonant or pleasing sounds that can be used with UAV 10, as detailed more fully below.

The present disclosure contemplates designing UAV 10 to emit a more consonant or pleasing sound for a user. In an example, UAV 10 can have propellers 12 that are designed to emit a musical note that is a consonant or pleasing sound, or a combination of musical notes (e.g., a chord) that result in a consonant or pleasing sound. For instance, in an example each propeller 12 of UAV 10 can be designed to emit its own unique musical note, certain pairs or subsets of propellers 12 can emit a first note with other pairs or subsets of propellers 12 emitting a second note (or a third note, etc.), or each propeller 12 of UAV 10 can be designed to emit the same musical note. The resulting sound can be a consonant or pleasing sound to a user.

In an example, propellers 12 of UAV 10 can be designed so that, in combination, propellers 12 each emit a musical note that produces a consonant or pleasing musical sound (e.g., a musical chord). In the case of UAV 10 of FIG. 1, which merely for exemplary purposes has four (4) propellers 12, the first through third propellers 12 can be designed to emit a different musical note that, when combined, form a musical chord, while the fourth propeller 12 can be designed to emit the same musical note as one of the first through third propellers 12 (i.e., so that a proper musical chord is emitted). Propellers 12 can be designed to emit a certain musical note by designing each propeller 12 to emit a particular sound frequency when rotated at a certain RPM.

Merely as an example, any of the following design characteristics of a propeller 12 can be configured so that, when propeller 12 is rotated at a certain RPM a desired musical note (e.g., a D note) is emitted: (i) radius 62, (ii) pitch 54, (iii) planform area, (iv) number of blades 14, (v) blade stiffness, (vi) tip geometry 60, (vii) leading edge radius 33, (vii) chord length 40, (viii) maximum camber 46, (ix) maximum thickness 48, (x) position of propellers 12 relative to a body of UAV 10, and/or (xi) any other suitable design characteristic for a propeller 12.

As can be appreciated, certain design characteristics of propellers 12 can be modified to have an immediate effect on the sound output by such propellers 12. As an example, radius 62 of propellers 12 (and thus diameter), in addition to RPM, can be modified to output a particular musical note while maintaining a desired amount of thrust. In this regard, the computer of UAV 10 can be programmed by way of software, as described in connection with FIGS. 6-8, to direct UAV 10's motor or motors to rotate propellers 12 at certain pre-set RPM speeds that produce a particular musical note. Such speeds can cause UAV 10 to hover close to a user (e.g., upon initial takeoff) and emit a consonant or pleasing D-chord sound, as an example, or the speeds can cause UAV 10 to perform another flight pattern and emit a consonant or pleasing sound (e.g., a musical note). This is in contrast to the dissonant or displeasing sounds that are emitted by UAVs (e.g., recreational UAVs) in the industry today. A user can therefore receive immediate and pleasing feedback from UAV during use. It is to be understood in the above example that, while the RPM and radius 62 of certain propellers 12 can be different to produce a different sound, the other design characteristics of propellers 12 (e.g., characteristics (i)-(xi) disclosed above) can be consistent amongst propellers 12. Thus, propellers 12 can be designed to emit different sounds by merely adjusting radius 62 and/or RPM speeds for certain propellers 12 of UAV 10.

As can be appreciated, although only radius 62 and RPM are mentioned above as design characteristics that can be modified so that a propeller 12 outputs a particular musical note, it is contemplated that any of design characteristics (i) to (xi) disclosed above can be modified in various combinations to design a propeller 12 that outputs a certain musical note. Merely as an example, any of design characteristics (i) to (xi) disclosed above (e.g., pitch 54, planform area, blade count, tip geometry 60, etc.) can be different amongst propellers 12 or subsets thereof so that a propeller 12 or combination of propellers 12 emits a first desired musical note, while another propeller 12 or combination of propellers 12 emits a second or third musical note, etc. The notes, in combination, can cause UAV 10 to emit a consonant or pleasing sound (e.g., a musical chord). In a particular example, the thrust output for a first propeller 12 when rotated at a given RPM can be modified by modifying one or more of design characteristic (i) to (xi) disclosed above. The same is true for second, third, fourth, etc. propellers 12 of UAV 10. In this way, a propeller 12 or subset of propellers 12 can be designed to produce a desired amount of thrust and to emit a particular note when rotated at a given RPM, while another propeller 12 or subset of propellers 12 can be designed to produce a desired amount of thrust and emit another note when rotated at a given RPM. Merely as an example, radius 62 of propellers 12 could be kept constant amongst propellers 12, but any of the other design characteristics (ii) to (xi) could be different amongst propellers 12 to provide a different thrust profile, such that certain propellers 12 could be rotated at different RPMs to emit different notes. The different notes, in combination, can produce a consonant or pleasing sound. Of course, still other combinations are possible and are envisioned by the disclosure, while taking account the design characteristics needed for stable flight.

In other examples, the thrust for propellers 12 can be increased or decreased (e.g., stepwise or continuously) while maintaining a relationship between the notes emitted by propellers 12, such that a consonant or pleasing sound (e.g., a chord) is output as thrust changes for UAV 10. For instance, a hover scenario is discussed above for UAV 10, but other flying conditions would be suitable for employing the concepts of the disclosure (e.g., racing or general recreational flight). In an example, the computer of UAV 10 can be programmed with a stepwise control function application that can direct UAV 10's motor or motors to change the thrust of propellers 12, while maintaining a relationship between the notes emitted by propellers 12. For instance, the stepwise control function application can direct UAV 10's motor or motors to change the thrust of propellers 12, such that a difference between the log of the sound frequency of a first, root propeller 12 and a second propeller 12 is about 0.33 at different levels of thrust (e.g., different RPMs), and the difference between the log of the sound frequency of the first, root propeller 12 and a third propeller 12 is about 0.58 at different levels of thrust (e.g., different RPMs). Such a relationship is described above in connection with FIGS. 5A-B. Further, in an example, at each different level of thrust, a consonant or pleasing sound can be emitted (e.g., a musical chord) by maintaining the above mathematical relationships.

An exemplary application of the concepts of the disclosure can be found in an initial-takeoff scenario for UAV 10. For instance, at initial takeoff, UAV 10 could rotate its propellers 12 at a first preset RPM(s) to emit a first consonant or pleasing sound (e.g., a chord such as a D-chord), which can indicate initial startup of UAV 10. Then, UAV 10 could rotate its propellers 12 at a second, different RPM(s) to emit a second consonant or pleasing sound (e.g., a chord such as an E-chord), which can indicate that hover has been achieved. Put simply, UAV 10 can be designed and programmed by way of the concepts discussed above to emit certain consonant or pleasing sounds (e.g., chords) when UAV 10 is in different modes. This can signify to a user that UAV 10 is, in fact, intentionally emitting consonant or pleasing sounds (e.g., chords) for a purpose. Certain modes that can be programmed into UAV 10's computer, thereby causing UAV 10 to emit different consonant or pleasing sounds (e.g., chords), can include but are not limited to a "selfie" mode, an "orbit" mode, a "follow" mode (e.g., where UAV 10 follows a user while a user is engaged in sport), an "air mount" mode, a "hover" mode, etc.

Alternative mechanisms for changing the output of sound emitted from UAV 10 can also be employed. As an example, design characteristics (i)-(ix) and (xi) could be consistent amongst propellers 12, but design characteristic (x) — i.e., the position of propellers 12 relative to the body of UAV 10 — can be different. This can create a situation in which weight distribution is not completely even across UAV 10, and certain propellers 12 might need to provide more thrust than other propellers 12 during flight. As such, propellers 12 would have to rotate at different RPMs, and emit different notes. The position of propellers 12 can be configured on UAV 10 so that propellers 12 emit consonant note combinations, as disclosed above.

In further examples, harmonics can be employed to change the perception of sound emitted from UAV 10. A harmonic series is a sequence of sounds in which the frequency of each sound is an integer multiple of the fundamental, i.e., the lowest frequency. Further, nth order harmonics can be characterized as a sequence of sounds in which the frequency of each sound is at some whole octave interval from the fundamental, i.e., the lowest frequency. UAV 10 can employ harmonic series or nth order harmonics by way of propellers 12 to emit a consonant or pleasing sound. Merely as an example, in the case of nth order harmonics, a first propeller 12 can be designed to emit a D note in a first scale, and a second propeller 12 can be designed to emit a D note in a second scale (e.g., at a whole octave interval from the first propeller 12). Still other propellers 12 can also be designed to emit D notes in other scales (e.g., at successive whole octave intervals). With such a design, a user would hear the same "note", but the sound would be richer and more pleasant. As a further example, each propeller 12 of UAV 10 can be designed to emit sounds that form a harmonic series. A harmonic series is usually perceived as a more consonant, pleasant sound. Thus, designing propellers 12 to emit sounds that are part of a harmonic series can improve perception and usability of UAV 10.

Still other strategies can be employed to produce a more pleasing sound by UAV 10, such as frequency spreading or frequency masking. As an example, certain propellers 12 can be designed to emit a sound that masks a sound emitted by other propellers 12 of UAV 10. The masking of the sound emitted by certain propellers 12 can result in a more pleasing sound emitted by UAV 10. In addition, frequency spreading techniques can be used amongst propellers 12 to produce a more pleasing sound emitted by UAV 10.

UAV Controller

FIG. 6 is a block diagram illustrating an example UAV control system 1200 of a UAV such as the UAV 10 previously described with reference to various example embodiments. In various examples, the block diagram may be illustrative of one or more aspects of UAV control system 1200 that may be used to implement the various systems and methods discussed above. In the illustrated implementation, UAV control system 1200 can include one or more processors 1202, coupled to a non-transitory computer readable storage medium in the form of a memory 1220 via an input/output (I/O) interface 1210. UAV control system 1200 can also include a propeller motor controller 1204, such as an electronic speed control (ESC), a power supply 1206 and/or a navigation system 1208.

In various implementations, UAV control system 1200 can be a uniprocessor system including one processor 1202, or a multiprocessor system including several processors 1202 (e.g., two, four, eight, or another suitable number). Processor(s) 1202 can be any suitable processor capable of executing instructions. For example, in various implementations, processor(s) 1202 can be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 can commonly, but not necessarily, implement the same ISA.

Non-transitory computer readable storage medium 1220 can be configured to store executable instructions, data, navigation paths, and/or data items accessible by processor(s) 1202. In various implementations, non-transitory computer readable storage medium 1220 can be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within non-transitory computer readable storage medium 1220 as program instructions 1222 and data storage 1224 1226, respectively. In other implementations, program instructions and/or data can be received, sent or stored upon different types of computer-accessible media, such as non-transitory media, or on similar media separate from non-transitory computer readable storage medium 1220 or UAV control system 1200. Generally speaking, a non-transitory, computer readable storage medium may include storage media or memory media such as magnetic or optical media, e.g., disk or CD/DVDROM, coupled to UAV control system 1200 via I/O interface 1210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface 1216.

In one implementation, I/O interface 1210 can be configured to coordinate I/O traffic between processor (s) 1202, non-transitory computer readable storage medium 1220, and any peripheral devices, network interface 1210 or other peripheral interfaces, such as input/output devices 1218. In some implementations, I/O interface 1210 can perform any necessary protocol, timing or other data transformations to convert data signals from one component (e.g., non-transitory computer readable storage medium 1220) into a format suitable for use by another component (e.g., processor(s) 1202). In some implementations, I/O interface 1210 can include support for devices attached through various types of peripheral buses, such as a variant of the Peripheral Component Interconnect (PCI) bus standard or the Universal Serial Bus (USB) standard, for example. In some implementations, the function of I/O interface 1210 can be split into two or more separate components, such as a north bridge and a south bridge, for example. Also, in some implementations, some or all of the functionality of I/O interface 1210, such as an interface to non-transitory computer readable storage medium 1220, can be incorporated directly into processor(s) 1202.

Propeller motor(s) controller 1204 can communicate with navigation system 1208 and adjust the power of each propeller motor to guide the UAV along a determined navigation path to a location. Navigation system 1208 can include a GPS or other similar system than can be used to navigate the UAV to and/or from a location. e.g.

Network interface 1216 can be configured to allow data to be exchanged between the UAV control system 1200, other devices attached to a network, such as other computer systems, and/or with UAV control systems of other UAVs. For example, network interface 1216 can enable wireless communication between numerous UAVs that are in flight. In various implementations, network interface 1216 can support communication via wireless general data networks, such as a Wi-Fi network. For example, network interface 1216 can support communication via telecommunications networks such as cellular communication networks, satellite networks, and the like.

Input/output devices 1218 can, in some implementations, include one or more displays, image capture devices, thermal sensors, infrared sensors, time of flight sensors, accelerometers, pressure sensors, weather sensors, etc. Multiple input/output devices 1218 can be present and controlled by UAV control system 1200. One or more of these sensors can be utilized to assist in the landing as well as avoid obstacles during flight. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 6, memory 1220 can include program instructions 1222 which may be configured to implement the example processes and/or sub-processes described above. Data storage 1224 can include various data stores for maintaining data items that may be provided for determining navigation paths, landing, etc.

In various implementations, the parameter values and other data illustrated herein as being included in one or more data stores can be combined with other information not described or may be partitioned differently into more, fewer, or different data structures. In some implementations, data stores can be physically located in one memory or may be distributed among two or more memories.

Software Architecture

FIG. 7 is a block diagram illustrating an example software architecture 1306, which can be used in conjunction with various hardware architectures herein described. FIG. 7 is a nonlimiting example of a software architecture and it will be appreciated that many other architectures can be implemented to facilitate the functionality described herein. Software architecture 1306 can execute on hardware such as machine 1400 of FIG. 8 that includes, among other things, processors 1404, memory 1414, and I/O components 1418. A representative hardware layer 1352 is illustrated and can represent, for example, in machine 1400 of FIG. 8. Representative hardware layer 1352 can include a processing unit 1354 having associated executable instructions 1304. Executable instructions 1304 can represent the executable instructions of the software architecture 1306, including implementation of the methods, components and so forth described herein. Hardware layer 1352 can also include memory and/or storage modules memory/storage 1356, which can also have executable instructions 1304. Hardware layer 1352 can also comprise other hardware 1358.

In the example architecture of FIG. 7, software architecture 1306 can be conceptualized as a stack of layers where each layer can provide particular functionality. For example, software architecture 1306 can include layers such as an operating system 1302, libraries 1320, applications 1316 and a presentation layer 1314. Operationally, the applications 1316 and/or other components within the layers may invoke application programming interface (API) calls 1308 through the software stack and receive a response as in response to API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

Operating system 1302 can manage hardware resources and provide common services. Operating system 1302 can include, for example, a kernel 1322, services 1324 and drivers 1326. Kernel 1322 can act as an abstraction layer between the hardware and the other software layers. For example, kernel 1322 can be responsible for memory management, processor management (e.g., scheduling), component management, networking, security settings, and so on. Services 1324 can provide other common services for the other software layers. Drivers 1326 can be responsible for controlling or interfacing with the underlying hardware. For instance, drivers 1326 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 1320 can provide a common infrastructure that is used by the applications 1316 and/or other components and/or layers. Libraries 1320 can provide functionality that allows other software components to perform tasks in an easier fashion than to interface directly with the underlying operating system 1302 functionality (e.g., kernel 1322, services 1324 and/or drivers 1326). Libraries 1320 can include system libraries 1344 (e.g., C standard library) that can provide functions such as memory allocation functions, string manipulation functions, mathematical functions, and the like. In addition, libraries 1320 can include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 1320 can also include a wide variety of other libraries 1348 to provide many other APIs to the applications 1316 and other software components/modules.

Frameworks/middleware 1318 (also sometimes referred to as middleware) can provide a higher-level common infrastructure that may be used by the applications 1316 and/or other software components/modules. For example, frameworks/middleware 1318 can provide various graphic user interface (GUI) functions, high-level resource management, high-level location services, and so forth. Frameworks/middleware 1318 can provide a broad spectrum of other APIs that may be utilized by applications 1316 and/or other software components/modules, some of which may be specific to a particular operating system 1302 or platform.

Applications 1316 can include built-in applications 1338 and/or third-party applications 1340. Examples of representative built-in applications 1338 can include, but are not limited to, a contacts application, a browser application, a book reader application, a location application, a media application, a messaging application, and/or a game application. Third-party applications 1340 can include an application developed using the ANDROID™ or IOS™ software development kit (SDK) by an entity other than the vendor of the particular platform, and can be mobile software running on a mobile operating system such as IOS™, ANDROID™, WINDOWS® Phone, or other mobile operating systems. Third-party applications 1340 can invoke the API calls 1308 provided by the mobile operating system (such as operating system 1302) to facilitate functionality described herein.

Applications 1316 can use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

FIG. 8 is a block diagram illustrating components of a machine 1400, according to some example embodiments, able to read instructions from a machine-readable medium (e.g., a machine-readable storage medium) and perform any one or more of the methodologies discussed herein. Specifically, FIG. 8 shows a diagrammatic representation of machine 1400 in the example form of a computer system, within which instructions 1410 (e.g., software, a program, an application, an applet, an app, or other executable code) for causing the machine 1400 to perform any one or more of the methodologies discussed herein may be executed. As such, instructions 1410 can be used to implement modules or components described herein. Instructions 1410 transform the general, non-programmed machine 1400 into a particular machine 1400 programmed to carry out the described and illustrated functions in the manner described. In alternative embodiments, machine 1400 operates as a standalone device or can be coupled (e.g., networked) to other machines. In a networked deployment, machine 1400 can operate in the capacity of a server machine or a client machine in a server-client network environment, or as a peer machine in a peer-to-peer (or distributed) network environment. Machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

Machine 1400 can include processors 1404, memory memory/storage 1406, and I/O components 1418, which can be configured to communicate with each other such as via a bus 1402. Memory/storage 1406 may include a memory 1414, such as a main memory, or other memory storage, and a storage unit 1416, both accessible to processors 1404 such as via bus 1402. Storage unit 1416 and memory 1414 can store instructions 1410 embodying any one or more of the methodologies or functions described herein. Instructions 1410 can also reside, completely or partially, within memory 1414, within the storage unit 1416, within at least one of processors 1404 (e.g., within the processor's cache memory), or any suitable combination thereof, during execution thereof by machine 1400. Accordingly, memory 1414, storage unit 1416, and the memory of processors 1404 can be examples of machine-readable media.

I/O components 1418 can include a wide variety of components to receive input, provide output, produce output, transmit information, exchange information, capture measurements, and so on. The specific I/O components 1418 that can be included in a particular machine 1400 will depend on the type of machine. For example, portable machines such as mobile phones can likely include a touch input device or other such input mechanisms, while a headless server machine can likely not include such a touch input device. It will be appreciated that I/O components 1418 can include many other components that are not shown in FIG. 8. I/O components 1418 can be grouped according to functionality merely for simplifying the following discussion and the grouping is in no way limiting. In various example embodiments, I/O components 1418 can include output components 1426 and input components 1428. Output components 1426 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1428 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, I/O components 1418 can include biometric components 1430, motion components 1434, environmental environment components 1436, or position components 1438 among a wide array of other components. For example, biometric components 1430 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 1434 can include acceleration sensor components (e.g., accelerometer), gravitation sensor components, rotation sensor components (e.g., gyroscope), and so forth. Environment components 1436 can include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 1438 can include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication can be implemented using a wide variety of technologies. I/O components 1418 can include communication components 1440 operable to couple machine 1400 to a network 1432 or devices 1420 via coupling 1422 and coupling 1424 respectively. For example, communication components 1440 can include a network interface component or other suitable device to interface with network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 1420 can be another machine or any of a wide variety of peripheral devices (e.g., a peripheral device coupled via a Universal Serial Bus (USB)).

Moreover, communication components 1440 can detect identifiers or include components operable to detect identifiers. For example, communication components 1440 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via communication components 1440, such as, location via Internet Protocol (IP) geolocation, location via Wi-Fi® signal triangulation, location via detecting a NFC beacon signal that can indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multiprocessor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Alternate Embodiments

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims. For example, the order of method steps or stages can be altered from that described above, as would be appreciated by a person of skill in the art.

It will also be appreciated that the various dependent claims, examples, and the features set forth therein can be combined in different ways than presented above and/or in the initial claims. For instance, any feature(s) from the above examples can be shared with others of the described examples, and/or a feature(s) from a particular dependent claim may be shared with another dependent or independent claim, in combinations that would be understood by a person of skill in the art.

What is claimed is:

1. An unmanned aerial vehicle (UAV) comprising:
a drive system comprising a motor or a plurality of motors;
a processor operatively coupled to the drive system to control operation of the drive system; and
a plurality of propellers that are rotatably drivable by the drive system, the plurality of propellers having physical characteristics such that, when drivingly rotated to maintain the UAV in stable flight, a first of the plurality of propellers emits a first note, and a second of the plurality of propellers emits a second, different note, a combination of the first and second notes producing a consonant sound, the plurality of propellers having a thrust, the processor configured to change the thrust of the plurality of propellers by modifying the rotations per minute (RPM) of each propeller in the plurality of propellers while maintaining the consonant sound.

2. The UAV of claim 1, wherein a frequency of the first note is an integer multiple of a frequency of the second note.

3. The UAV of claim 1, wherein the physical characteristics of a third of the plurality of propellers is such that, when drivingly rotated to maintain the UAV in stable flight, the third propeller emits a third note different from the first and second notes, a combination of the first through third notes producing a consonant sound.

4. The UAV of claim 3, wherein a frequency of the first note is a first integer multiple of a frequency of the third note, and a frequency of the second note is a second integer multiple of the frequency of the third note.

5. The UAV of claim 1, wherein the first propeller has a first diameter and the second propeller has a second, different diameter.

6. The UAV of claim 5, further comprising: a memory storing program instructions that, when executed by the processor, cause the processor to control the operation of the drive system to drive the motor or plurality of motors at first and second rotational speeds, thereby rotating the first propeller at a first rotational speed and the second propeller at a second rotational speed.

7. The UAV of claim 1, wherein the first note has a first sound frequency $F_1$ and the second note has a second, different sound frequency $F_2$, and a difference between $\log2(F_1)$ and $\log2(F_2)$ is comprised between 0.32 and 0.34.

8. The UAV of claim 3, wherein the first note has a first sound frequency $F_1$, the second note has a second, different sound frequency $F_2$, and the third note has a third, different sound frequency $F_3$, a difference between $\log2(F_1)$ and $\log2(F_2)$ being comprised between 0.32 and 0.34, and a difference between $\log2(F_1)$ and $\log2(F_3)$ being comprised between 0.57 and 0.59.

9. The UAV of claim 1, wherein the first and second propellers each has at least a first design feature that is different amongst the first and second propellers, the design feature being selected from the group consisting of: (i) blade radius, (ii) blade pitch, (iii) planform area, (iv) number of blades, (v) blade stiffness, (vi) blade tip geometry, (vii) blade leading edge radius, (vii) blade chord length, (viii) blade maximum camber, (ix) blade maximum thickness, and (x) position of the propeller relative to a body of the UAV.

10. The UAV of claim 9, wherein the first design feature that is different amongst the first and second propellers is selected so that the first propeller, when rotated, emits the first note, and the second propeller, when rotated, emits the second note.

11. The UAV of claim 1, wherein all of the propellers of the UAV have physical characteristics such that, when drivingly rotated to maintain the UAV in stable flight, all of the propellers emit notes that, in combination, produce a consonant sound.

12. The UAV of claim 1, wherein the first and second propellers produce the first and second notes when the UAV is in hover.

13. A method of producing a sound using an unmanned aerial vehicle (UAV) comprising:
operating the UAV to cause first and second propellers of the UAV to rotate and emit first and second sounds that correspond to first and second different notes, a combination of the first and second different notes producing a consonant sound; and
changing a thrust of the first and second propellers by modifying the rotations per minute (RPM) of each of the first and second propellers while maintaining the consonant sound.

14. The method of claim 13, wherein operating the UAV further comprises:
  causing the first propeller to rotate at a first speed to produce the first note, and
  causing the second propeller to rotate at a second, different speed to produce the second note.

15. The method of claim 13, wherein a frequency of the first note is an integer multiple of a frequency of the second note.

16. The method of claim 13, further comprising operating the UAV to cause a third propeller to rotate and emit a third sound that corresponds to a third note that is different from the first and second notes, a combination of the first through third notes producing a consonant sound.

17. The method of claim 16, wherein operating the UAV further comprises:
  causing the first propeller to rotate at a first speed to produce the first note, causing the second propeller to rotate at a second, different speed to produce the second note, and causing the third propeller to rotate at a third speed different from the first and second speeds to produce the third note.

18. The method of claim 13, wherein the first propeller has a first diameter and the second propeller has a second, different diameter.

19. The method of claim 16, wherein the first note has a first sound frequency $F_1$, the second note has a second, different sound frequency $F_2$, and the third note has a third, different sound frequency $F_3$, a difference between $\log2(F_1)$ and $\log2(F_2)$ being comprised between 0.32 and 0.34, and a difference between $\log2(F_1)$ and $\log2(F_3)$ being comprised between 0.57 and 0.59.

20. An unmanned aerial vehicle (UAV) comprising:
  a plurality of propellers operatively coupled to a drive system;
  a processor; and
  a memory having instructions stored thereon, when executed by the processor, causes the processor to control operation of the drive system to maintain the UAV in stable flight, wherein, when the UAV is maintained in stable flight,
  the plurality of propellers rotate, and
  differences in physical characteristics of the plurality of propellers cause
    a first of the plurality of propellers to emit a first note,
    a second of the plurality of propellers to emit a second, different note, and
    a third of the plurality of propellers to emit a third note different from the first and second notes, a combination of the first through third notes producing a consonant sound, the plurality of propellers having a thrust, the processor is configured to change the thrust of the plurality of propellers by modifying the rotations per minute (RPM) of each propeller in the plurality of propellers while maintaining the consonant sound.

* * * * *